Aug. 28, 1956 E. W. BUCK Re. 24,203

ELECTROMAGNETIC DRILL UNIT

Original Filed May 10, 1952 3 Sheets-Sheet 1

INVENTOR
EUGENE W. BUCK
BY
Webster & Webster
ATTORNEYS

ELECTROMAGNETIC DRILL UNIT

Original Filed May 10, 1952 3 Sheets-Sheet 2

INVENTOR
EUGENE W. BUCK
BY
Webster & Webster
ATTORNEYS

ELECTROMAGNETIC DRILL UNIT

Original Filed May 10, 1952 3 Sheets-Sheet 3

INVENTOR
EUGENE W. BUCK
BY
Webster & Webster
ATTORNEYS

United States Patent Office

Re. 24,203

Reissued Aug. 28, 1956

24,203

ELECTROMAGNETIC DRILL UNIT

Eugene W. Buck, Campbell, Calif.

Original No. 2,672,770, dated March 23, 1954, Serial No. 287,233, May 10, 1952. Application for reissue June 6, 1955, Serial No. 513,622

8 Claims. (Cl. 77—7)

Matter enclosed in heavy brackets [ ] appears in the original patent but forms no part of this reissue specification; matter printed in italics indicates the additions made by reissue.

The present invention is directed to a portable, electromagnetically supported drill unit, and in particular represents modifications of the structure shown in my copending application, Serial No. 254,993, filed November 6, 1951, on Portable Magnetic Base Drill [.], *now Patent 2,622,457, dated December 23, 1952.*

The principal object of the present invention is to provide an electro-magnetic drill unit which is of simplified but sturdy and dependable construction, and of compact assembly; the unit including a tubular main post which houses the rectifier, thus effectively shielding the same against damage during normal use of said unit.

Another important object of the instant invention is to provide an electro-magnetic drill unit which is rigidly magnetically secured to a metal work-piece and thus very stable when in use; the invention contemplating the employment of one or more electro-magnetic feet disposed in symmetrical arrangement relative both to the drill and to a rear stabilizing leg which the device includes.

A further object of this invention is to provide an electro-magnetic drill unit which permits of its magnetic attachment to a flat metal work-piece in a position for convenient drilling close to an edge of the work-piece or in a corner thereof.

An additional object of the invention is to provide, as an attachment, a device which permits the drill unit to be easily converted for use, in clamping engagement, on a round shaft or pipe.

It is also an object of the invention to provide an electro-magnetic drill unit which is designed for ease and economy of manufacture; the unit being especially adapted, but not limited, for use with an initially separate portable or hand-type electric drill.

Still another object of the invention is to provide a practical and reliable electro-magnetic drill unit, and one which will be exceedingly effective for the purpose for which it is designed.

These objects are accomplished by means of such structure and relative arrangement of parts as will full appear by a perusal of the following specification and claims.

Figure 1:
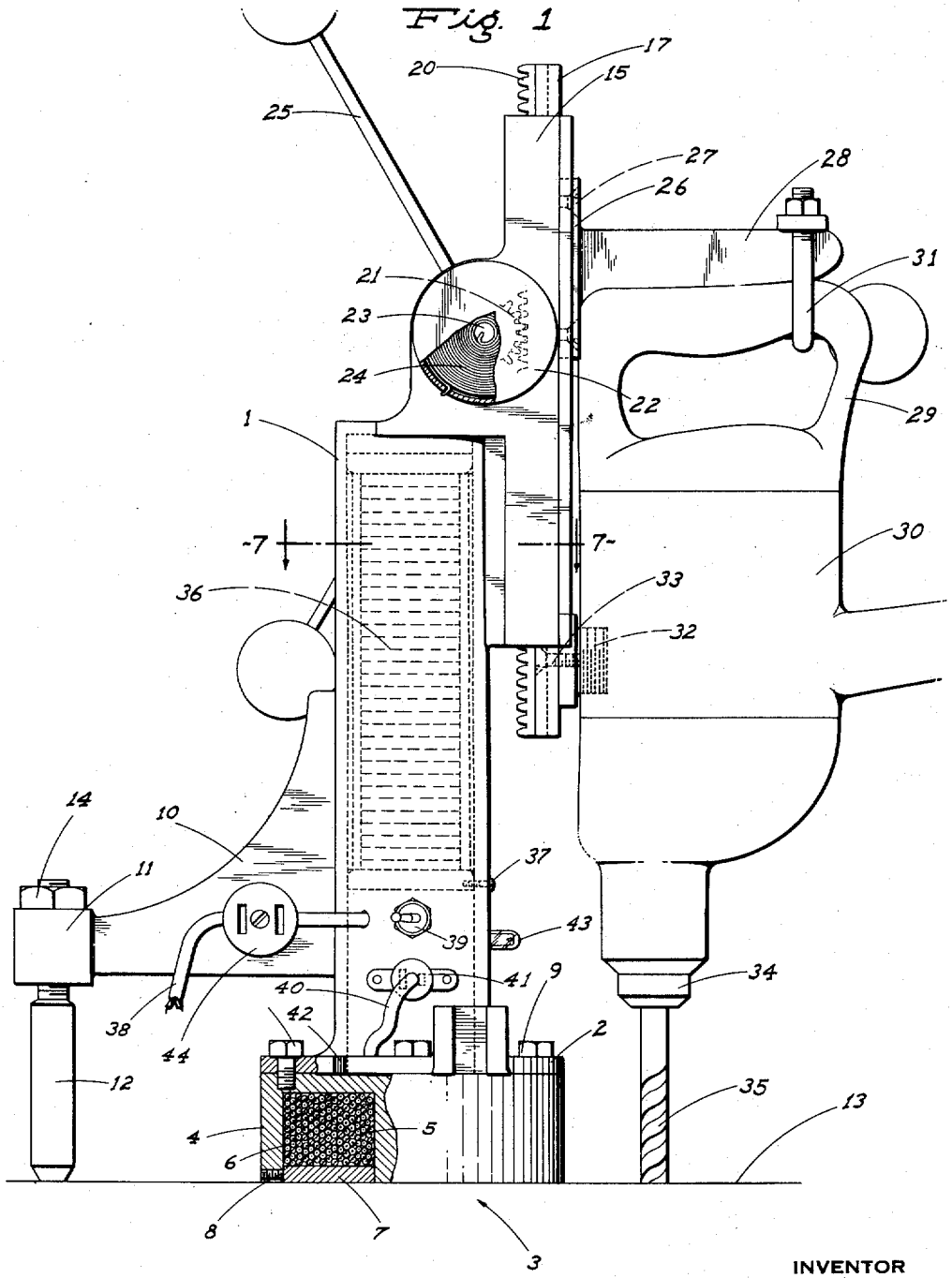
Figure 1 is a side elevation of the electro-magnetic drill unit as in use with a single electro-magnetic foot; the view being broken away in part to show certain details.
Figure 7:
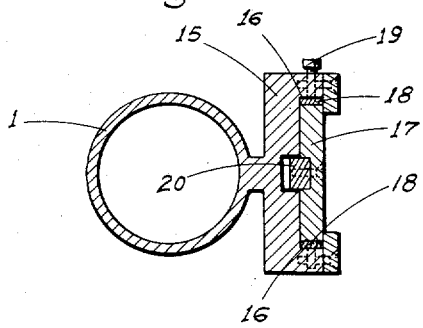
Figure 7 is a cross section on line 7—7 of Figure 1.
Figure 8:
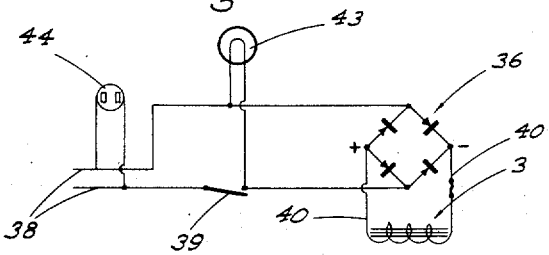
Figure 8 is a diagram of the circuit.

Referring now more particularly to the characters of reference on the drawings, and at present to Figures 1, 7 and 8, the electro-magnetic drill unit comprises an upstanding, tubular post *or housing* 1 fitted, at its lower end, with an enlarged circular base plate 2 which is disposed substantially horizontally.

Such base plate 2 is secured in matching relation on top of an electro-magnetic foot, indicated generally at 3.

The electro-magnetic foot 3 comprises a circular body 4 of iron; which body is formed internally with an annular channel 5 which houses a ring-like electro-magnetic coil 6. The coil 6 is maintained in the channel 5 by means of a bottom ring 7 whose displacement is normally prevented by set screws 8. The base plate 2 is affixed to the top of the body 4 by cap screws 9.

A bracket 10 is fixed to, and projects rearwardly from, the upstanding tubular post 1 at the back of the latter; such bracket 10 being of relatively short extent radially of said post.

At its outer end the bracket 10 is formed with a vertical-axis boss 11, and the upper end of a rear stabilizing leg 12 is adjustably threaded through such boss from below. The rear leg 12 is adjusted in its downward projection to bear on the metallic work-piece 13 in a manner so that the electro-magnetic foot 3 may rest flush on said work-piece.

A locking nut 14, threaded on the upper end of the leg 12, normally bears against the boss 11 to prevent such leg from turning out of adjustment.

At the upper front portion thereof the post 1 is fixed in connection with a vertical guideway 15, which guideway extends from a point intermediate the ends of the post 1 upwardly to a top termination some distance thereabove.

The guideway 15 includes side grooves 16 facing each other, and a slide 17 runs vertically in the guideway 15, being carried at opposite edges in the groves 16. Friction strips 18 are disposed in the grooves 16 and prevent too free motion of said slide 17; one of said friction strips 18 being subject to adjustment by one or more adjustment screws 19.

The slide 17 is adapted to be manually run upwardly or downwardly as follows:

Such slide 17 is fitted, on the inner face thereof and centrally of its side edges, with a vertical rack 20, and a pinion 21 disposed in a pinion housing 22 runs in mesh with said rack. The pinion housing 22 is disposed above the upper end of the post 1, and the pinion 21 is carried on a cross shaft 23 which extends horizontally from side to side of said housing. Additionally, the housing 22 encloses a coil-type return spring 24 connected with said cross shaft 23.

At one end the cross shaft 23 projects out of the housing 22, and is there fitted with a spider-type handle 25.

On the front side thereof, and adjacent the top, the slide 17 carries an attachment plate 26 secured to said slide by screws 27; there being an attachment arm 28 which projects forwardly from the plate 26 for matching engagement with the handle 29 of a vertically disposed, *normally separate* portable electric drill 30. The arm 28 is attached to the handle 29 by a U-clamp 31.

Additional connection is provided between the drill 30 and the slide 17 by means of a screw plug 32 threaded into the drill body, and attached to the slide by a screw 33 adjacent the lower end of said slide.

As so *detachably* mounted, the drill 30 projects directly downwardly, with the drill chuck 34 above the workpiece 13, but sufficiently close for a twist drill 35 carried by said chuck to run downward into such workpiece. *The base structure comprising the pole member 4 and the stabilizing leg 12, spaced from each other, provides an extended stabilizing or supporting line for the drill.*

The coil 6 of the electromagnetic foot 3 is adapted to be D. C. energized, and to this end a cylindrical *torque free* rectifier 36 of full-wave bridge type *comprising only stationary parts* is disposed in the post 1 in protective relation, being secured therein by suitable means such as a set screw 37. *A known full-wave bridge type rectifier of the kind referred to is disclosed in the patent to Bonner 2,459,788, granted January 25, 1949.*

The circuit, which includes the coil 6 and rectifier 36 (see Figure 8 in conjunction with Figure 1), comprises a main A. C. supply circuit 38 in the form of a cord which leads into the post 1 to connection with the rectifier 36; there being a switch 39 in one lead of said circuit, and which switch is mounted on the side of the post 1 adjacent the lower end thereof.

The rectifier output circuit 40, in the form of a cord, leads out of the post 1 and thence passes downwardly through the base plate to connection, internally, with the coil 6 of the foot 3. In order to permit of detachment of the foot 3, the cord 40 has a plug and socket unit 41 interposed therein, and said cord 40 passes through an open-ended slot 42 in the base plate 2.

A signal light 43 is wired across the main circuit 38 beyond the switch 39, serving to indicate to the operator when the unit is electrically energized; said signal light being mounted on the front of the post 1.

An electric socket 44 for plug-in of the cord (not shown) which energizes the drill 30 is mounted on one side of the bracket 10 in parallel connection with the main circuit 38.

With the above described electro-magnetic drill unit, the electric drill 30 is carried on a rigid, stable stand when the electromagnetic foot 3 is adhered to the workpiece 13 with the rear leg 12 likewise bearing on the same. Thereafter, by the simple expedient of working the handle 25, the operator can run the drill 35 directly into the work. Also, by reason of the relative arrangement of the parts—i. e. the twist drill 35 ahead of the foot 3, and the leg 12 rearwardly of the latter—the device can be set so that the drill 35 may work near an edge or into a corner of said workpiece.

Figure 3:
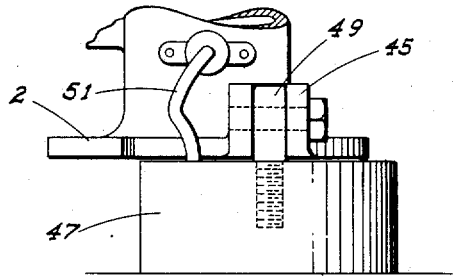
Figure 3 is a fragmentary side elevation of the same.
Figure 2:
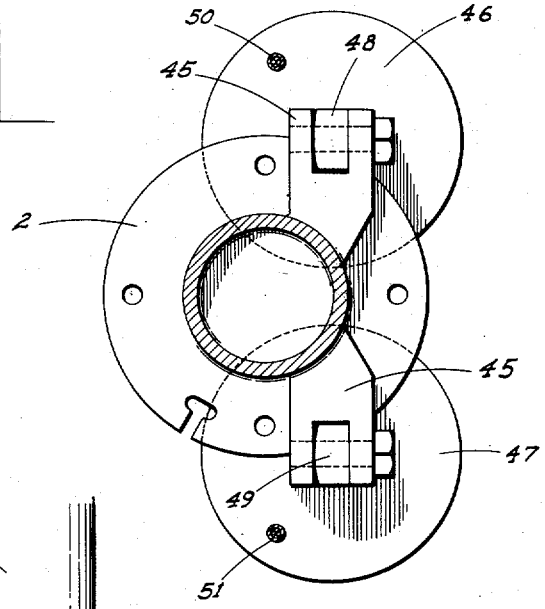
Figure 2 is a sectional plan view taken through the main post directly above the base plate; the view showing such plate as arranged with dual electro-magnetic feet.

For heavy-duty work, or increased stability, it may be desirable to employ a pair of electromagnetic feet, and to this end the base plate 2 is formed, on opposite sides but adjacent the front, with laterally outwardly projecting attachment lugs 45 which are forked. These lugs appear on the base plate 2, as shown in Figure 1, and in Figures 2 and 3 such lugs are shown in use.

To employ two electromagnetic feet, indicated at 46 and 47, the foot 3 is detached, and in lieu thereof the feet 46 and 47 are connected to the lugs 45 in adjacent but spaced side by side relation. The feet 46 and 47 include upstanding tongues 48 and 49 which are bolted into the corresponding lugs 45, as shown; such feet being of the same construction and electrical arrangement with respect to the coil as the foot 3. The feet 46 and 47 have electric supply cords 50 and 51 which lead upwardly; the cord 51 being adapted to connect with the plug and socket unit 41 on the post 1, while the cord 50 has similar connection (not shown) on the opposite side of said post.

Figure 4:
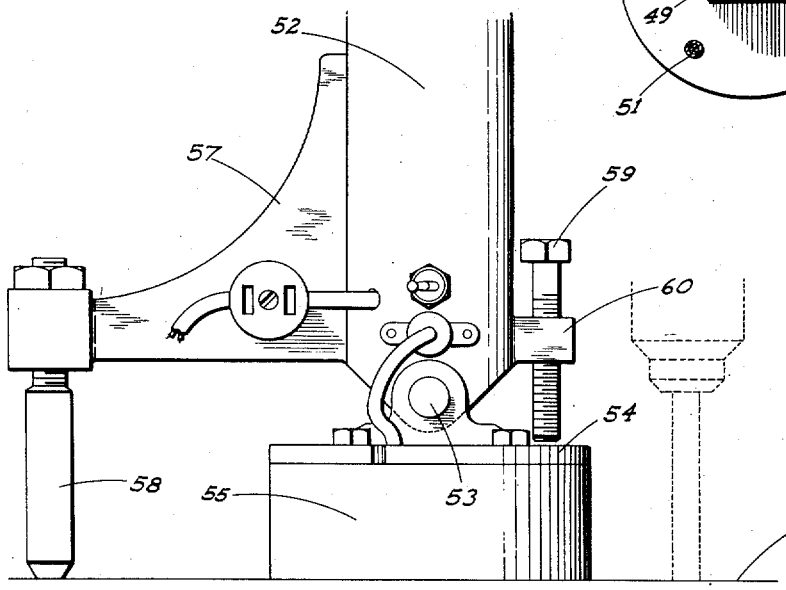
Figure 4 is a fragmentary elevation showing the lower portion of the device as modified to provide a swivel connection between the lower end of the main post with an electro-magnetic foot.

In the embodiment of Figure 4 the post is indicated at 52, and at its lower end has pivotal connection, as at 53, with the base plate 54 secured to the electromagnetic foot 55, as aforesaid. The purpose of the pivotal connection 53, which has a transverse horizontal axis, is to permit the foot 55 to accommodate itself to any unevenness which may exist in the workpiece 56.

In order to prevent the post 52 from tipping too far forwardly about the pivotal axis 53 when the foot 55 is deenergized, a stop screw 59 is threaded through a forwardly projecting boss 60 and extends downwardly to adjacent but short of the foot 55 ahead of said pivotal axis.

Figure 5:
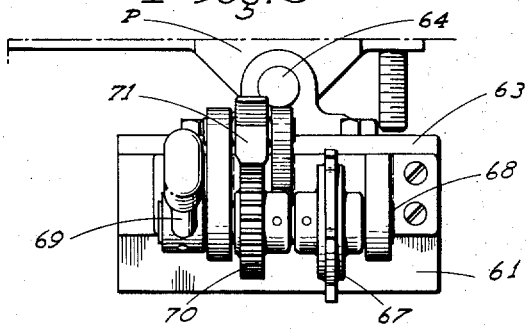
Figure 5 is a side elevation showing the attachment device which permits the drill unit to be used on a round shaft or pipe.
Figure 6:
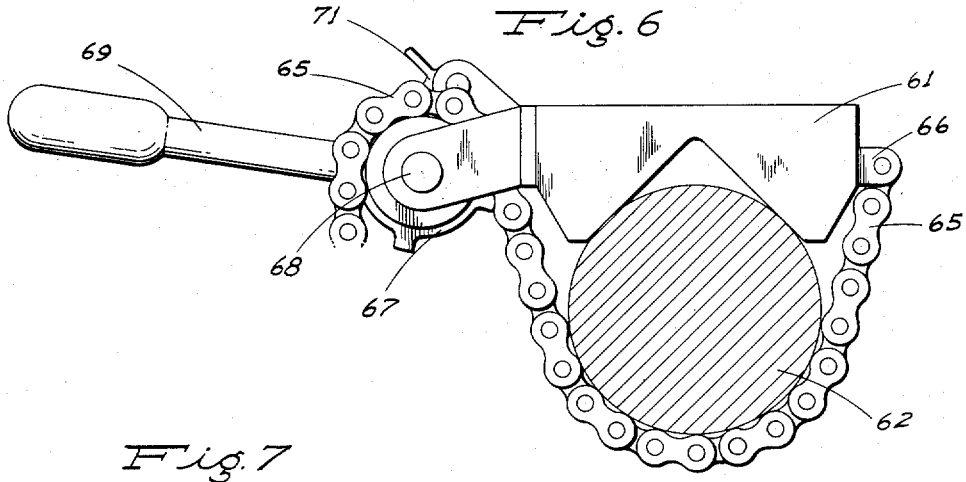
Figure 6 is an end elevation of said device as clamped on a shaft; the device being shown detached from the remainder of the drill unit.

Under certain working conditions it may be desired to employ the device in connection with radial drilling of a round workpiece, such as a pipe or a shaft. To accomplish this I provide the attachment device shown in Figures 5 and 6.

This device comprises a saddle block 61 adapted to seat on the round workpiece 62, the saddle block 61 being attached to the lower end of the post P of the device by securing said block to the base plate, here indicated at 63. In the present instance the base plate 63 is shown as having pivotal connection 64 with the post in the manner of Figure 4, but a fixed connection, as in Figure 1, can be employed if desired. A chain 65 is anchored to one end of the saddle block 61, as at 66, and thence extends downwardly under the workpiece 62 and upwardly over a sprocket 67 fixed on a cross shaft 68 journaled in connection with, but spaced outwardly from the saddle block 61.

After manual engagement of the chain 65 under the workpiece and over the sprocket 67, said chain is tightened by rotation of the cross shaft 68 through the medium of a hand lever 69 thereon.

Intermediate the sprocket 67 and hand lever 69, the cross shaft 68 carries a ratchet wheel 70 with which a releasable holding pawl 71 cooperates. The holding pawl 71, working against the ratchet wheel 70, maintains the chain 65 taut about the workpiece 62.

With the above described attachment device the drill unit can be effectively set to drill radially into the workpiece 62.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. A drill unit comprising an upstanding post, a support for an electric drill, means mounting the support on the post at the front for up and down motion, a pair of electro-magnetic feet disposed in transversely spaced relation symmetrically below the post, means securing the feet in connection with the lower end of the post, a rigid bracket projecting from the lower portion of the post at the rear, and a stabilizing leg extending downward from the outer end of the bracket.

2. A drill unit comprising an upstanding post, a support for an electric drill, means mounting the support on the post at the front for up and down motion, an electromagnetic foot disposed below the post, a base plate between the lower end of the post and the foot and secured to the latter, a rigid bracket projecting from the lower portion of the post at the rear, a vertically adjustable stabilizing leg extending downward from the outer end of the bracket, and a pivot connecting the base plate and the lower end of the post; the axis of the pivot being disposed at right angles to a median line drawn between a drill and the leg.

3. A drill unit comprising an upstanding post, a support for an electric drill, means mounting the support on the post for up and down movement and so that the axis of a drill is spaced from the front side of the post a predetermined distance, an electromagnetic foot mounted in connection with the post directly below the same, a bracket projecting rearwardly from the post adjacent the lower end thereof, and a stabilizing leg depending from the bracket; the lower end of the leg, post and drill lying substantially in a common horizontal line.

4. A drill unit comprising an upstanding post, a support for an electric drill, means mounting the support on the post for up and down movement and so that the axis of a drill is spaced from the front side of the post a predetermined distance, an enlarged base plate on the lower end of the post for removable mounting on a magnetic foot, lugs projecting laterally from the base plate and post on opposite sides of the latter, and elements removably connected to and depending from the lugs for mounting connection with transversely spaced magnetic feet when the first named foot is dismounted from the base plate.

*5. A portable unitary electromagnetic support unit for a normally separate portable electric drill, said unit comprising an upstanding tubular post having a vertically disposed guideway thereon, a support for the electric drill, means for detachably mounting the electric drill on said support, means mounting said support in said guideway for up and down movement with the axis of the drill in an upright direction, means including a centrally disposed element on said support for effecting up and down movement thereof, a base structure connected to and supporting said tubular post and extending transversely thereto and including means forming an extended stabilizing line for the drill, said base structure including an electromagnetic pole member having a recess therein and also including an electromagnetic coil in said recess, said pole member providing a supporting foot structure under said post, and electrical means for energizing said electromagnetic coil including a torque free rectifier comprising only stationary parts in said tubular post.*

*6. A portable unitary electromagnetic support unit for a normally separate portable electric drill, said unit comprising an upstanding hollow main frame, a support for the electric drill, means for detachably mounting the electric drill on said support, means mounting the support on said frame for up and down movement with the axis of the drill in an upright direction, a base structure connected to and supporting said main frame and extending transversely thereto to provide an extended stabilizing line for the drill, said base structure including an electromagnetic pole member having a recess therein and also including an electromagnetic coil in said recess, said pole member providing a supporting foot structure under said frame, and electrical means for energizing said electromagnetic coil including a torque free rectifier comprising only stationary parts in said hollow main frame.*

*7. A portable unitary electromagnetic support unit for a normally separate portable electric drill constructed for operation by an A. C. current, said unit comprising an upstanding hollow main frame, a support slide for the electric drill, means for detachably mounting the electric drill on said support slide, means mounting the support slide on said frame for up and down sliding movement with the axis of the drill in an upright direction, a base structure connected to and supporting said main frame and extending transversely thereto to provide an extended stabilizing line for the drill, said base structure including an electromagnetic pole member having a recess therein and also including an electromagnetic coil in said recess, said pole member providing a supporting foot structure under said frame, and electrical means for eneregizing said electromagnetic coil including a torque free rectifier comprising only stationary parts in said hollow main frame, a single electrical cord electrically connected to said rectifier and extending from said unit for connection to a source of A. C. current, and an electrical outlet for said drill on said unit and connected to said cord to receive A. C. current therefrom.*

*8. A portable unitary electromagnetic support unit for a normally separate portable electric drill constructed for operation by an A. C. current, said unit comprising an upstanding hollow main frame, a support slide for the electric drill, means for detachably mounting the electric drill on said support slide, means mounting the support slide on said frame for up and down sliding movement with the axis of the drill in an upright direction, a base structure connected to and supporting said main frame and extending transversely thereto to provide an extended stabilizing line for the drill, said base structure including an electromagnetic pole member having a recess therein and also including an electromagnetic coil in said recess, said pole member providing a supporting foot structure under said frame, and electrical means for energizing said electromagnetic coil including a torque free rectifier comprising only stationary parts in said hollow main frame, a single electrical cord electrically connected to said rectifier and extending from said unit for connection to a source of A. C. current, an electrical outlet for said drill on said unit and connected to said cord to receive A. C. current therefrom, and a switch between said rectifier and said cord.*

References Cited in the file of this patent or the original patent

UNITED STATES PATENTS

| | | |
|---|---|---|
| 596,375 | Murchie | Dec. 28, 1897 |
| 676,043 | Lincoln | June 11, 1901 |
| 1,023,921 | Brown | Apr. 23, 1912 |
| 1,176,584 | Madgett | Mar. 21, 1916 |
| 1,184,829 | Crist | May 30, 1916 |
| 2,024,390 | Roesch | Dec. 17, 1935 |

FOREIGN PATENTS

| | | |
|---|---|---|
| 369,374 | France | Jan. 10, 1907 |
| 583,158 | Great Britain | Dec. 10, 1946 |
| 691,267 | France | July 7, 1930 |
| 896,945 | France | May 8, 1944 |